United States Patent
Amon et al.

(10) Patent No.: US 8,837,850 B2
(45) Date of Patent: Sep. 16, 2014

(54) METHOD FOR REDUCING NOISE FOR CODING OF NOISY IMAGES OR IMAGE SEQUENCES

(75) Inventors: Peter Amon, München (DE); Andreas Hutter, München (DE); André Kaup, Effeltrich (DE); Eugen Wige, Küps (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 13/574,502

(22) PCT Filed: Jan. 12, 2011

(86) PCT No.: PCT/EP2011/050321
§ 371 (c)(1),
(2), (4) Date: Jul. 20, 2012

(87) PCT Pub. No.: WO2011/089047
PCT Pub. Date: Jul. 28, 2011

(65) Prior Publication Data
US 2012/0288213 A1 Nov. 15, 2012

(30) Foreign Application Priority Data

Jan. 20, 2010 (EP) .................................. 10000540
Jul. 27, 2010 (EP) .................................. 10007801

(51) Int. Cl.
*G06K 9/40* (2006.01)

(52) U.S. Cl.
USPC ............ 382/261; 382/232; 382/233; 382/260

(58) Field of Classification Search
CPC . H04N 7/26888; H04N 5/21; H04N 7/26058; H04N 7/50; H04N 7/30; H04N 7/26244; H04N 7/26313; H04N 7/26106; H04N 7/26271; H04N 7/26335; G06T 5/001; G06T 5/20; G06T 5/50; G06K 9/40; G09G 2340/02; G09G 2340/0407; G09G 3/20
USPC .......... 382/232, 233, 260, 261; 348/699, 716, 348/E5.062; 375/240.11, 240.12, 240.16, 375/240.27

See application file for complete search history.

(56) References Cited

U.S. PATENT DOCUMENTS

| | | | | |
|---|---|---|---|---|
| 5,929,913 | A | * | 7/1999 | Etoh ......................... 375/240.11 |
| 6,040,864 | A | * | 3/2000 | Etoh ......................... 375/240.16 |
| 6,782,132 | B1 | * | 8/2004 | Fogg ............................. 382/232 |
| 7,496,236 | B2 | * | 2/2009 | Fogg ............................. 382/233 |
| 8,189,934 | B2 | | 5/2012 | Wittmann et al. ............ 382/232 |

FOREIGN PATENT DOCUMENTS

| | | |
|---|---|---|
| JP | 8-79765 | 3/1996 |
| WO | 2007/111292 A1 | 10/2007 |

OTHER PUBLICATIONS

English Translation of Japanese Office Action mailed Dec. 16, 2013 in corresponding Japanese Application No. 2012-549304.

* cited by examiner

*Primary Examiner* — Anh Do

(57) ABSTRACT

A prediction error ($e_q[x,y]$) is added to a predicted frame ($\hat{f}[x,y]$) or a predicted block for receiving a decoded frame ($g_q[x,y]$) or a decoded block to be further used in a prediction loop by an encoder or to be sent to the output of a decoder. The reference frame ($g_q[x,y]$) or the reference block includes a useful signal part and a noise signal part. The reference frame ($g_q[x,y]$) or reference block pass through a dedicated noise reducing filter to reduce or eliminate the noise signal part of the reference frame ($g_q[x,y]$) or reference block.

17 Claims, 5 Drawing Sheets

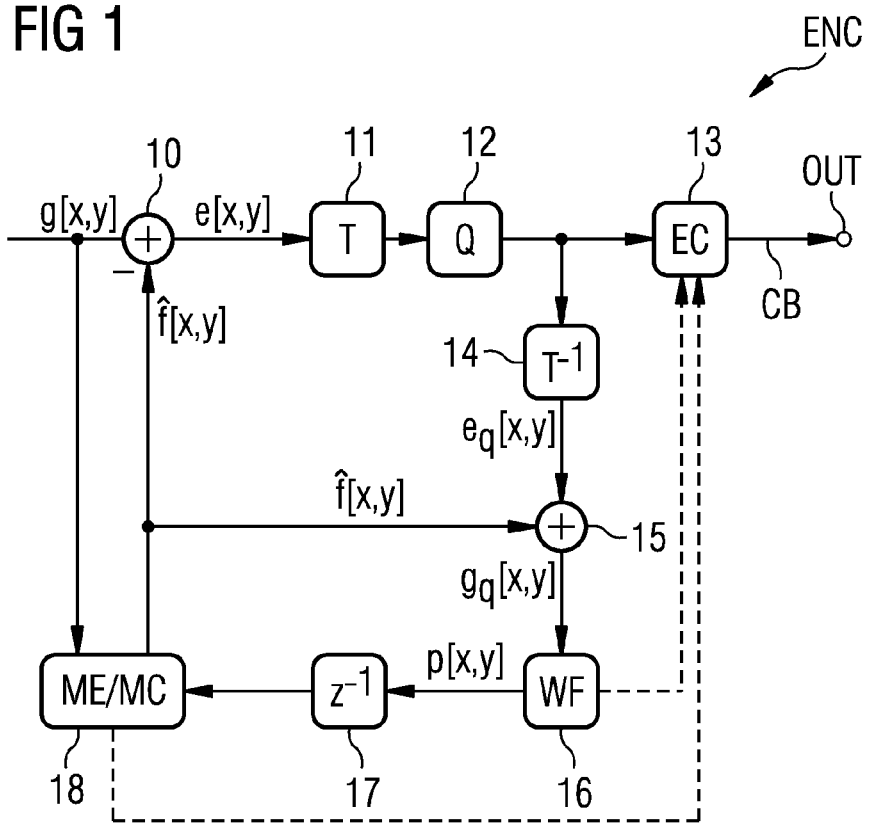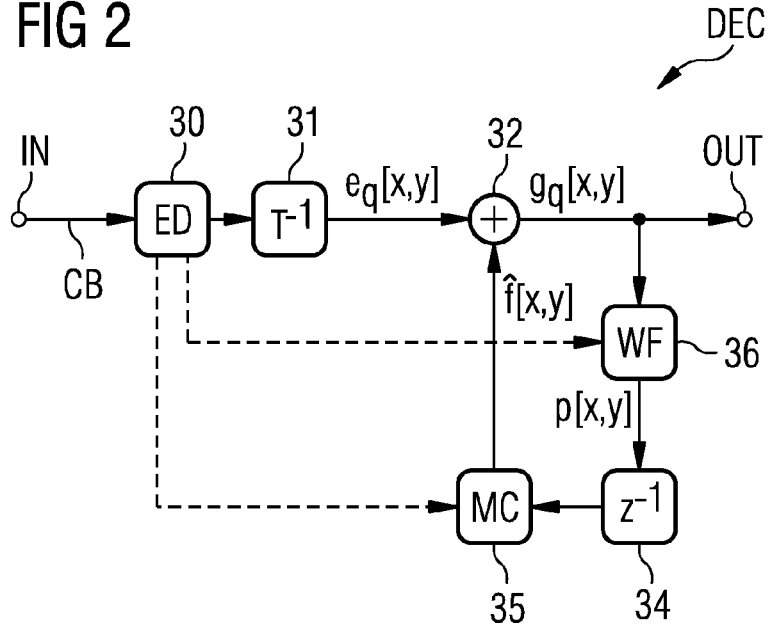

METHOD FOR REDUCING NOISE FOR CODING OF NOISY IMAGES OR IMAGE SEQUENCES

CROSS REFERENCE TO RELATED APPLICATIONS

This application is the U.S. national stage of International Application No. PCT/EP2011/050321 filed Jan. 12, 2011, and claims the benefit thereof. The International Application claims the benefits of European Application No. EP10000540 filed on Jan. 20, 2010 and European Application No. EP10007801 filed on Jul. 27, 2010, all applications are incorporated by reference herein in their entirety.

BACKGROUND

Described below is a method for reducing noise for coding of noisy images or image sequences.

Professional video applications such as monitoring systems for buildings, industrial manufacturing and medical applications need video signals with very high quality. These signals are likely to have very high resolutions in spatial as well as temporal direction, so the uncompressed data can become very large. It is therefore important to compress these signals as much as possible without visible information loss. Recent video compression systems exploit the temporal correlation between images, but they are optimized for consumer quality applications.

Usually, image sequences that are acquired by a physical process can be considered to be degraded by noise caused through the acquisition process. Noise might result from sensor noise, amplifier noise or quantization noise, and so on. It has been found that at very high quality so-called inter-frame coding becomes less efficient relative to so-called intra-frame coding. An inter-frame is a frame in a video compression stream which is expressed in terms of one or more neighbouring frames. The "inter" part of the term refers to the use of inter-frame prediction. This kind of prediction tries to take advantage from temporal redundancy between neighbouring frames in order to achieve higher compression rates. The term intra-frame coding refers to the fact that the various lossless and lossy compression techniques are performed relative to information that is contained only within the current frame and not relative to any other frame in the video sequence. In other words, no temporal processing is performed outside of the current picture or frame. It is expected that the reason for the different efficiencies of inter- and intra-frame coding is (additive) noise within a video signal which effects the motion compensated prediction inside a video encoder/decoder.

In order to improve the coding efficiency, different algorithms can be applied to the noisy image sequences prior to encoding.

The noise pre-filtering can be done inside the video encoder. Thus, the bitrate for coding a noisy image sequence is reduced while its subjective quality is improved. However, the filtering process introduces errors, which is not allowed in lossless compression of video signals.

Another approach for bitrate reduction is in-loop filtering of lossy encoded video data. In lossy coding a deblocking filter or quantization noise removal filter can improve the coding efficiency as well as the visual quality of the signal. An in-loop denoising filter for reduction of impulse noise leads to a bitrate reduction and subjective quality improvement.

SUMMARY

It is therefore desirable to provide a method to improve noise reduction for coding of noisy image sequences. It is a further desirable to provide a method to improve noise reduction for lossless coding of noisy image sequences. Also described below are an encoder and a decoder which allow an improvement in noise reduction for coding of noisy image sequences.

The method described below reduces noise in coding of noisy images or image sequences. The method includes adding a prediction error and a predicted frame or a predicted block for receiving a decoded frame or a decoded block to be further used in a prediction loop by an encoder or to be sent to the output of a decoder, wherein the reference frame or the reference block includes a respective useful signal part and a noise signal part. Also, the method includes denoising of the reference frame or reference block only with a dedicated noise reducing filter to reduce or eliminate the noise signal part of the reference frame or reference block.

In order to improve the motion compensated prediction for a noisy image or a noisy image sequence, the method is based on the idea to minimize the noise within the reference frame (which is an already reconstructed frame) while keeping as much relevant details as possible. As a result, less noise in the reference frame allows a more accurate motion estimation. Furthermore, the difference signal has less energy and thus leads to a bitrate reduction of the coded bitstream. Hence, a better reference frame for the frame prediction is generated. A further advantage is that a higher compression efficiency can be achieved.

A dedicated noise reducing filter is a filter which is specifically designed for filtering noise.

According to an embodiment the reference frame or the reference block is motion compensated by a motion compensation element to receive the predicted frame or the predicted block. The motion compensated reference frame or reference block therefore is the predicted frame or predicted block, also known as predictor or predictor signal to the person skilled in the art.

According to a further embodiment a noise adaptive filter is used which is adapted to estimate noise by evaluating the current frame to be coded. By evaluating the current frame the adaptive filter evaluates noise nature and statistical properties like mean, variance and autocorrelation function of the noise and so on. Furthermore, the useful signal part is analyzed with regard to video/image content, video/image resolution, statistical properties, and so on. After this evaluation, the noise adaptive filter removes as much noise as possible or appropriate while keeping the relevant details for coding. E.g., dark scenes usually contain more noise than bright image/video content. The properties of the noise adaptive filter imply a stronger filtering when more noise is present in the reference frame or the reference block that has to be used for prediction.

Furthermore, a pixel location adaptive filter can be used as noise reducing filter that takes into account the content of the reference frame or reference block. Especially, the amount of filtering might be dependent on local signal properties. The latter means that edges should be preserved for efficient video compression. For example, different filter windows with different sizes for filtering might be used.

In an embodiment, as noise reducing filter a minimum mean squared error (MMSE) estimator (e.g., a Wiener filter as a linear estimator) is used. However, any filter that reduces noise but preserves the image content can be used. It is not relevant whether the noise reducing filter has linear or non-linear properties.

According to a further embodiment, denoising of the reference frame is made within a prediction loop without directly affecting the prediction error which is further encoded by the encoder. Denoising within the prediction loop is sometimes referred to as in-loop denoising. According to this suggestion it is possible to make the method applicable to lossy as well as to lossless video coding.

It is further desirable that denoising is made before or after buffering the reference frame in a buffer of the prediction loop. Furthermore, the in-loop denoising filter could also be inserted after a motion compensation element which can be used especially for low noise levels.

According to a further embodiment denoising is applied on each colour channel of the reference frame separately or on their combination.

For lossless coding, a quantization element which is located in the path from a comparator comparing the current frame and the reference frame to an output outputting the prediction error and frame, respectively, is bypassed.

According to a further embodiment the current block to be coded and the reference block are blocks or regions (i.e., one pixel or an amount of pixels) of a single frame. Therefore, the block to be coded is called an intra-coded block (i.e., an intra-block).

According to a further embodiment, the same noise reducing filter is arranged in the encoder and the decoder to denoise the reference frame only. In other words, the same noise reducing (removal) filter has to be applied in the decoder. Denoising filter parameters of the noise reducing filter of the encoder might be part of the coded bitstream. In case that the denoising filter parameters are transmitted from the encoder to the decoder, a denoising filter parameter flag might be signalled. If the filter parameter flag is not set the decoder might estimate the filter parameters (or parts of the filter parameters) by itself. E.g., the noise strength can be estimated similarly at the encoder and the decoder.

According to a further embodiment, in the encoder a current frame to be coded is compared with the predicted frame or a predicted block for receiving the prediction error to be further used in the prediction loop by the encoder wherein the predicted frame or predicted block includes a useful signal part only (in the case of ideal noise filtering).

According to a further embodiment, denoising is adaptive with respect to a quantization parameter of the quantization element such that denoising is the lower the higher the quantization parameter (i.e., the higher the quantization step size) is, and vice versa. The denoising algorithm can be adaptive with respect to the quantization parameter as quantization of the noisy reference frame could partly have noise reducing capabilities on the noise part of the reference frame.

Also described is an encoder that adds a prediction error ($e_q[x, y]$) and a predicted frame ($\hat{f}[x, y]$) or a predicted block for receiving a decoded frame ($g_q[x, y]$) or a decoded block to be further used in a prediction loop by the encoder (ENC) or to be sent to the output of a decoder (DEC), wherein the reference frame ($g_q[x, y]$) or the reference block (FR) include a respective useful signal part and a noise signal part. The encoder further passes the reference frame ($g_q[x, y]$) or reference block (FR) through a dedicated noise reducing filter (WF) to reduce or eliminate the noise signal part of the reference frame ($g_q[x, y]$) or reference block (FR).

In addition, a decoder is described that adds a prediction error ($e_q[x, y]$) and a predicted frame ($\hat{f}[x, y]$) or a predicted block for receiving a decoded frame ($g_q[x, y]$) or a decoded block to be further used in a prediction loop by an encoder (ENC) or to be sent to the output of the decoder (DEC), wherein the reference frame ($g_q[x, y]$) or the reference block (FR) a respective useful signal part and a noise signal part. The decoder additionally passes the reference frame ($g_q[x, y]$) or reference block (FR) through a dedicated noise reducing filter (WF) to reduce or eliminate the noise signal part of the reference frame ($g_q[x, y]$) or reference block (FR).

It is to be noted that the method as well as the encoder and the decoder may be realized in software and may be executed by a computer or a processing unit.

BRIEF DESCRIPTION OF THE DRAWINGS

These and other aspects and advantages will become more apparent and more readily appreciated from the following description of the exemplary embodiments, taken in conjunction with the accompanying drawings of which.

FIG. 1 is block diagram of a first embodiment of an encoder according to the method.

FIG. 2 is block diagram of a first embodiment of a decoder according to the method.

DETAILED DESCRIPTION OF THE PREFERRED EMBODIMENT

Figure 3:
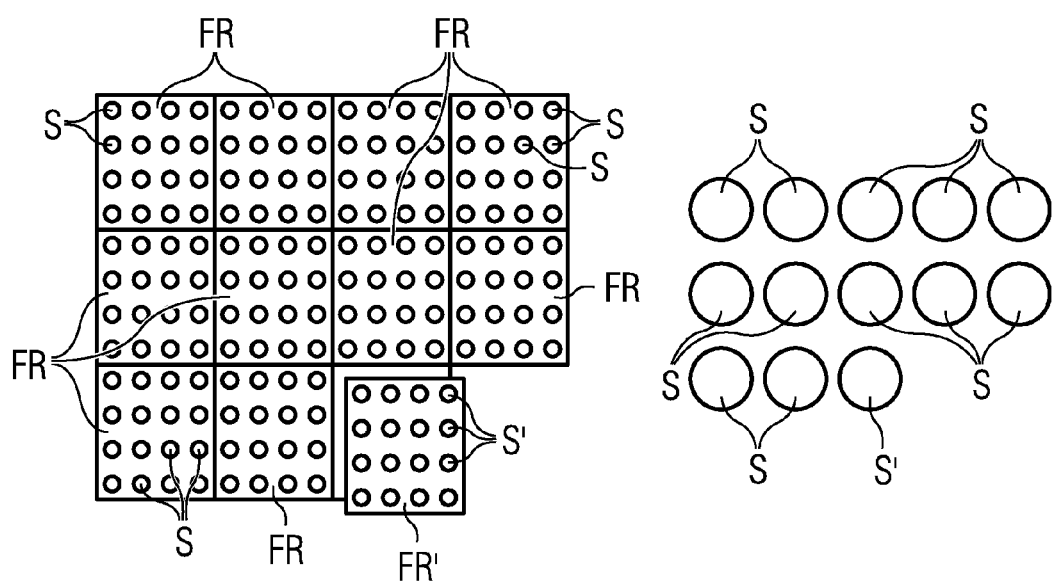
FIG. 3 is an illustration about the possibility to use the method for intra-prediction.

Reference will now be made in detail to the preferred embodiments, examples of which are illustrated in the accompanying drawings, wherein like reference numerals refer to like elements throughout.

The method will be described in more detail with the help of block diagrams of different encoders and decoders. For simplification, the block diagrams are observed at one specific point in time, where only one current frame $g[x, y]$ has to be coded and another predicted frame $\hat{f}[x, y]$ is available.

FIG. 1 shows a block diagram of a lossy video encoder ENC according to a first embodiment. The current frame $g[x, y]$ and the predicted frame $\hat{f}[x, y]$ are fed to a comparator 10. At the output of the comparator 10 a prediction error $e[x, y]$ is fed to a transformation block 11. The transformation block 11 which is known as T-block represents any further decorrelation of the prediction error $e[x, y]$, i.e. a (nearly) lossless reversible transformation. The output of the transformation block 11 is connected to a aquantizer 12, which could be bypassed or skipped for a lossless video encoder. The output of the quantizer 12 is connected to an entropy encoder 13 within the video encoder. The entropy encoder 13 is connected to an output OUT outputting a coded bitstream CB.

The predicted frame $\hat{f}$ is provided by the elements of a prediction loop. The prediction loop includes an inverse transformation block 14 which is adapted to reverse the transformed and optionally quantized prediction error $e[x, y]$. As a result, the inverse transformation block 14 feeds a reversed prediction error $e_q[x, y]$ to a first input of an adder 15. At a second input of the adder 15 the predicted signal $\hat{f}[x, y]$ is fed. At an output of the adder 15 a signal $g_q[x, y]$ which is a reconstructed current frame is fed to a noise reducing filter 16 for filtering noise, e.g. additive noise. The output of the noise reducing filter 16 is connected to a reference picture buffer 17. The reference picture buffer 17 is connected to a motion estimation and motion compensation element 18 within the encoder ENC. At the output of the motion estimation and motion compensation element 18 the (motion-compensated) reference frame $\hat{f}[x, y]$ is fed to the comparing and adding elements 10 and 15. The motion estimation and motion compensation element 18 furthermore receives the current frame g[x, y]. The entropy encoder 13 receives control information from the motion estimation and motion compensation element 18 as well as from the noise reducing filter 16.

The subtraction of the motion compensated reference frame (also called predicted frame) from the current frame with the comparator 10 in the video encoder ENC is described by the following equation:

$$e[x,y]=g[x,y]-\hat{f}[x,y] \quad (1),$$

where x and y are spatial coordinates, g[x, y] is the signal which describes the current frame which has to be compressed, $\hat{f}[x, y]$ is the predicted signal which describes the motion compensated reference frame and e[x, y] is the prediction error which has to be transmitted to the decoder shown in FIG. 2 after transformation, optional quantization and entropy encoding. Assuming that the image sequence is degraded by independent additive white noise, the signals can be written as:

$$g[x,y]=s_g[x,y]+n_g[x,y] \quad (2),$$

$$\hat{f}[x,y]=s_{\hat{f}}[x,y]+n_{\hat{f}}[x,y] \quad (3),$$

where $s_g$ and $s_{\hat{f}}$, respectively, is the useful part of the signal and $n_g$ and $n_{\hat{f}}$, respectively, is the noise part of the respective signal. From equations (1), (2) and (3) it follows that $$e[x, y] = \underbrace{s_g[x, y] - s_{\hat{f}}[x, y]}_{s_e[x,y]} + \underbrace{n_g[x, y] - n_{\hat{f}}[x, y]}_{n_e[x,y]}, . \quad (4)$$

From equation (4) it can be seen that the prediction error has two major components. The signal components $s_e$[x, y] can be minimized if the correlation between the current noise-free frame and the noise-free reference frame increases. However, the noise component $n_e$[x, y] becomes higher because the noise of the current frame in general is independent from the noise of the reference frame. In case of additive white Gaussian noise, the noise variance of the error image becomes twice as high as the noise variance of one of these two images.

Especially in lossless coding applications the noise part of the current picture has to be encoded. In order to increase the compression efficiency, the noise in the reference frame should be minimized without introducing high degradations in the useful part of the signal. This would allow minimizing the noise amount in the prediction error whereas keeping the coding process lossless.

The filter 16, which is introduced in FIG. 1 as a denoising filter for (additive) noise, is located on the same place in the encoder diagram as the usually used deblocking filter in lossy coding applications. Before saving the reconstructed image to the reference buffer 17 it should be processed by the denoising algorithm which will be explained later. However, denoising with the help of the noise reducing filter 16 also could be executed after buffering in the reference buffer 17.

The denoising algorithm is adapted to the noise nature present in the video, i.e. the current frames g[x, y]. In order to keep the coding process lossless, the same procedure should be applied in the decoder DEC. In FIG. 2, the diagram of a lossless decoder DEC is illustrated. In this figure, at an input IN of the decoder DEC the coded bitstream CB is fed to an entropy decoder 30. Reference numeral 31 depicts an inverse transformation block which is connected to an adder 32. At a first input, which is connected to the inverse transformation block 31 an error frame $e_q$[x, y] is fed. At a second input of the icomparator 32, which is connected to a motion compensation element 35 predicted frame $\hat{f}$[x, y] is fed. The output of the icomparator 32 is connected to the predictor loop, forming the same noise reducing filter 33 which is used in the encoder ENC, a reference buffer 34 and the motion compensation element 35.

In both the encoder ENC and the decoder DEC the noise reducing elements 16 and 33, respectively, are not connected to their outputs OUT. Therefore, the output signal (coded bitstream BC and encoded bitstream EB) is not influenced by the noise reducing filter.

In the decoder DEC the reference picture is first denoised before it is stored in the reference picture buffer 34. The major difference to a quantization noise removal filter or deblocking filter is that the image will be displayed before the noise filtering is applied. Otherwise the encoding and decoding process could not be lossless.

It is desirable to use an adaptive minimum mean squared error estimator (e.g., an adaptive Wiener filter as a linear estimator) algorithm for reduction of the (additive) noise in the reference frame. The filter minimizes the squared error between the noisy and the noise-free image sequence, which is the objective of a Wiener filter for Gaussian processes. Furthermore, the filter prevents smoothing of contours by using of local statistics of the image signal, which is important for accurate motion compensation.

If a one of a set of different filters (linear or non-linear) is used as noise reducing filter 16 at the encoder ENC the choice for the denoising filter and its parameters have to be signalled to the decoder to use the same information. Non-linear filters usually are used in medical imaging applications or if the Gaussian assumption for the characteristics of the useful signal or the noise signal is not correct.

Below, the denoising algorithm will be described in more detail, wherein, as an example, a Wiener filter is used as noise reducing filter:

In a local region where the signal and the additive noise are uncorrelated and are considered to be stationary, the Wiener filter is described by $$H(e^{j\Omega_x}, e^{j\Omega_y}) = \frac{\Phi_{ff}(e^{j\Omega_x}, e^{j\Omega_y})}{\Phi_{ff}(e^{j\Omega_x}, e^{j\Omega_y}) + \Phi_{nn}(e^{j\Omega_x}, e^{j\Omega_y})}, \quad (5)$$

where $\Phi_{ff}(e^{j\Omega_x},e^{j\Omega_y})$ and $\Phi_{nn}(e^{j\Omega_x},e^{j\Omega_y})$ are the power spectral densities of the signal f[x, y] and the noise n[x, y] respectively. In the case of white noise the power spectral density is reduced to $$\Phi_{nn}(e^{j\Omega_x},e^{j\Omega_y})=\sigma_n^2 \quad (6),$$

where $\sigma_n^2$ is the variance of the noise signal n[x, y], which is assumed to be the space invariant. The signal f[x, y] can be modelled by a sum of a space local mean $\mu_f$[x, y] and a space variant local variance $\sigma_f^2$[x, y]. If the signal f[x, y] is zero mean the power spectral density within the local region is reduced to $$\Phi_{ff}(e^{j\Omega_x},e^{j\Omega_y})=\sigma_f^2[x,y] \quad (7),$$

where $\sigma_f^2$[x, y] is the local variance of the image signal f[x, y]. Thus the Wiener filter within the local region is described by $$H(e^{j\Omega_x}, e^{j\Omega_y}) = \frac{\sigma_f^2[x, y]}{\sigma_f^2[x, y] + \sigma_n^2}. \quad (8)$$

Generally, the signal f[x, y] is not zero mean and thus the mean $\mu_f$[x, y] has to be subtracted from f[x, y] before filtering and has to be added again after filtering. The filtering process is described by the following equation:

$$p[x, y] = \mu_f[x, y] + \frac{\sigma_f^2[x, y]}{\sigma_f^2[x, y] + \sigma_n^2} \cdot (g[x, y] - \mu_f[x, y]). \quad (9)$$

The noise variance $\sigma_n^2$ is assumed to be known (i.e., from the acquisition process). As the noise is considered to be zero mean, $\mu_f[x, y]$ should be equal to $\mu_g[x, y]$ and the estimation of the local mean is reduced to:

$$\hat{\mu}_f[x, y] = \frac{1}{(2M+1)^2} \sum_{k=x-M}^{x+M} \sum_{l=y-M}^{y+M} g[k, l], \quad (10)$$

where M describes the window size in which the image signal is considered to be stationary. The estimation of the local variance of the noise-free image is described by the following equation:

$$\hat{\sigma}_f^2[x, y] = \begin{cases} \hat{\sigma}_g^2[x, y] - \sigma_n^2, & \text{if } \hat{\sigma}_g^2[x, y] > \sigma_n^2 \\ 0, & \text{else,} \end{cases} \quad (11)$$

where $\hat{\sigma}_g^2[x, y]$ is the local variance of the degraded image $g[x, y]$. The estimation of $\hat{\sigma}_g^2[x, y]$ is described by the following equation:

$$\hat{\sigma}_g^2[x, y] = \frac{1}{(2M+1)^2} \sum_{k=x-M}^{x+M} \sum_{l=y-M}^{y+M} (g[k, l] - \hat{\mu}_f[k, l])^2. \quad (12)$$

From these equations it is clear that noise reduction is obtained by averaging the pixel values in a rectangular window in dependency on the local signal and noise variances. Choosing a larger window by variation of M may lead to higher noise reduction, but it may also introduce more blurring of the useful signal part. Therefore, M can be considered as an optimization parameter for the compression. Also the variation of $\sigma_n^2$ can be considered as an optimization parameter. Increasing $\sigma_n^2$ leads to higher noise reduction whereas the useful signal part is more blurred.

As already stated above, the major property of the noise reducing filter 16 of the encoder ENC and 33 of the decoder DEC is their adaption to noise, i.e. the nature of the noise and statistical noise properties like mean, variance, autocorrelation function, and its adoption to the image signal, i.e. video/image content, video/image resolution and statistical properties. The filter in the encoder and decoder remove as much noise as possible or appropriate while keeping relevant details for coding and decoding. This implies a stronger filtering when more noise is present in the input data that have to be coded. On the other hand, the amount of noise filtering is dependent on the local signal properties. This means, for example edges will be preserved for efficient video compression. The filtering not only is noise-adaptive but also pixel location adaptive, e.g. by using different windows with different size for filtering.

The in-loop denoising as described above can be applied on each colour channel separately. It is also possible to apply the in-loop denoising on the combination of all colour channels.

It is to be noted that also in the encoder and decoder diagrams of FIGS. 1 and 2 the in-loop denoising filter 16 and 33, respectively, can be inserted after reference frame buffer 17 and 34, respectively, without any effect on the algorithm. In a further alternative, the in-loop denoising filter 16 and 33, respectively, could be inserted after motion estimation and motion control element 18 and motion control element 35, respectively. This alternative could be used especially for low noise levels.

As already noted, for lossless coding the quantization element 12 might by bypassed or skipped. By doing this the prediction error $e_q[x, y]$ becomes $e[x, y]$ and $g_q[x, y]$ becomes $g[x, y]$.

Within the encoder ENC a calculation of sub-pixels may be made with the motion estimation and motion compensation element 18. The algorithm may be enhanced by an interpolation denoising filter. The interpolation denoising filter is derived from the noise reducing filter 16. It could use similar properties and calculates adaptively the interpolation filter coefficients. As a result, the interpolation is noise-adaptive and pixel location adaptive with regard to edges and edge preserving.

The denoising filter parameters (filter properties, knowledge about noise and knowledge about the signal) are known or are estimated at the encoder and are transmitted to the decoder as a side information. Alternatively, some or all parameters may be derived at the decoder side. The transmission of the filter parameter may be signalled by a denoising filter parameter flag. If the filter parameter flag is not set, the decoder estimates the filter parameter by itself.

Furthermore, the denoising algorithm may be adaptive with respect to a quantization parameter of the quantization element 12 of the encoder in FIG. 1 as quantization noise masks the noise within the input signal. The bigger the quantization parameter is the less will be filtered with the noise reduction filter, and vice versa.

In general, noise estimator and its parameters can be selected at the encoder side. This choice can be signalled to the decoder. This means the information which algorithm will be used for an estimation of noise can be selected at the decoder side. The same algorithm should be used at the decoder side, as already noted.

The procedure of the method has been explained by reference to inter-frame coding where the current frame and the reference frame are frames of different images of an image sequence. However, for coding of noisy image sequences or single images the proposed method can also be applied to intra-coding. This is illustrated in FIG. 3.

In FIG. 3 an amount of blocks FR (i.e., regions of a frame, i.e., an amount of pixels) of a single image is illustrated. Each of the blocks FR has already been encoded. A block depicted with FR' is to be encoded. Each of the blocks FR includes a number of already decoded samples S. Samples which have to be predicted within block FR' are denoted with S'. In order to increase the compression efficiency, after encoding samples S, they are denoised by a causal denoising filter which has similar properties as the above mentioned in-loop denoising filter. It is to be noted that it is not relevant which intra-prediction method is chosen. E.g., directional prediction from neighbouring pixels of the block to be predicted (FR') can be applied. In this case, the reference block to be denoised is an artificially generated prediction signal for intra-coding.

FIGS. 4 to 6 show further embodiments of a decoder and encoder, respectively, executing the method described above. The already described in-loop filtering with respect to different applications, i.e. noise removal, quantization noise removal, deblocking and visual quality improvement, is separated into different major independent filters.

Figure 4A:
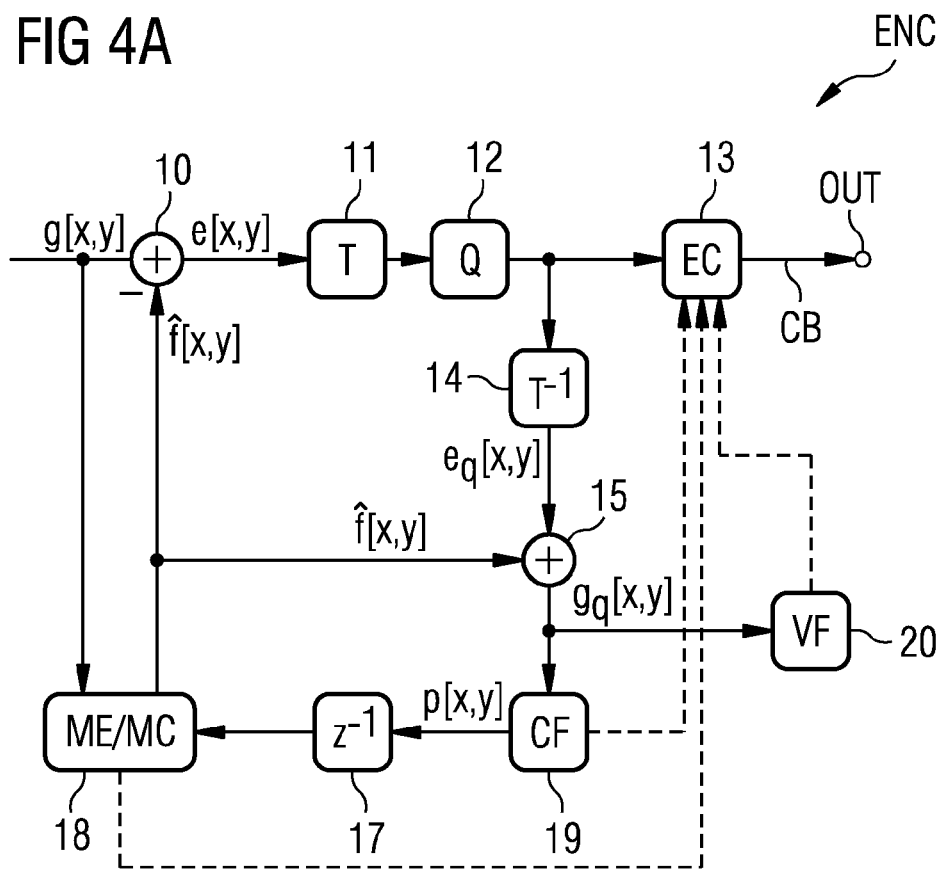
FIGS. 4A and 4B are block diagrams of a second embodiment of an encoder and a decoder, respectively.

In FIG. 4A the in-loop filter is formed of a compression filter 19 and a visual filter 20. The compression filter 19 is responsible for generation of the best possible predictor in order to reduce the bitrate and is therefore at a position as the noise reducing filter 16 in FIG. 1 (so-called in-loop filter). The compression filter 19 is not optimized according to the visual quality of the output signal. The visual filter 20 which is an out-of-loop filter is responsible for the subjective and/or objective quality of the output signal. Therefore, the visual filter 20 is connected to the adder 15 with its input and to the entropy encoder 13 with its output. The two filters 19 and 20 may be optimized independently of each other.

Figure 4B:
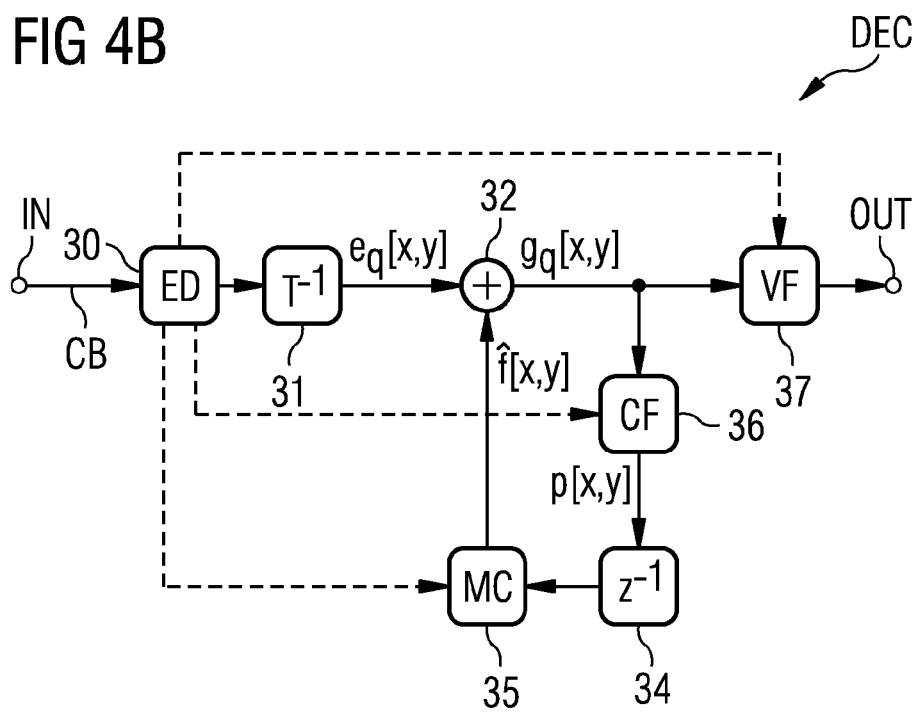

At the decoder side illustrated in FIG. 4B the compression filter 36 is the in-loop-filter part at a position of the noise reducing filter 33 in FIG. 2. The visual filter 37 is connected to the output of the decoder and is an out-of-loop filter.

Figure 5A:
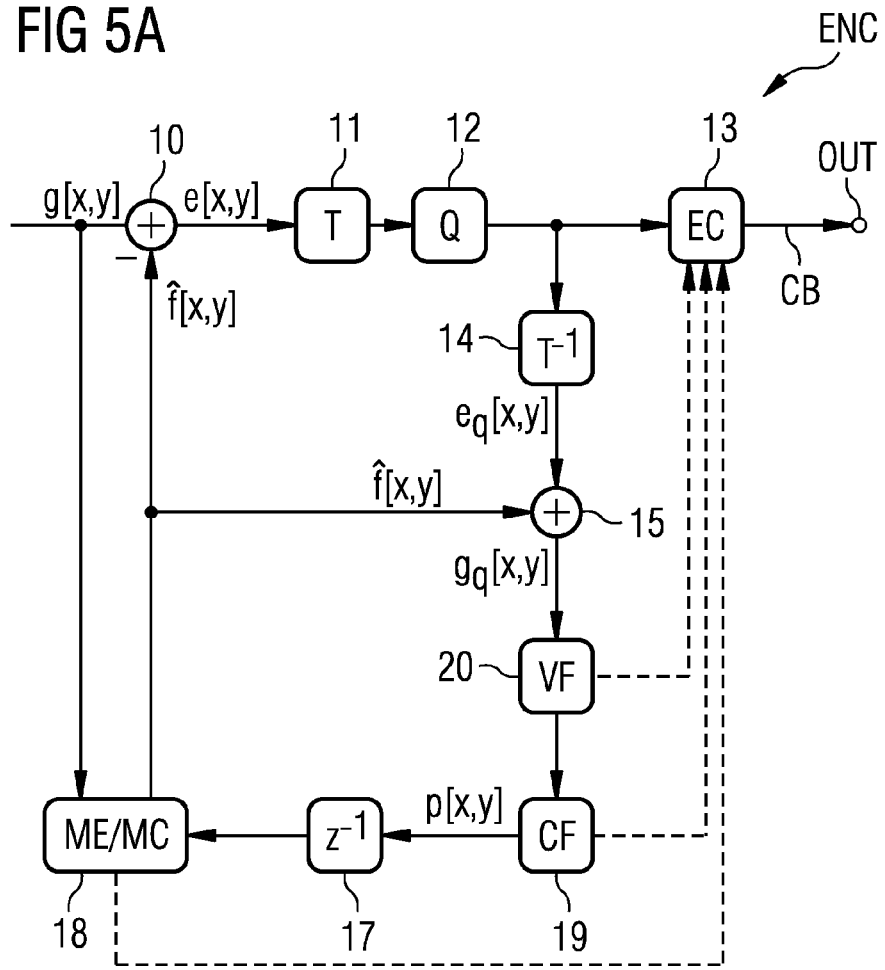
FIGS. 5A and 5B are block diagrams of a third embodiment of an encoder and a decoder, respectively.
Figure 5B:
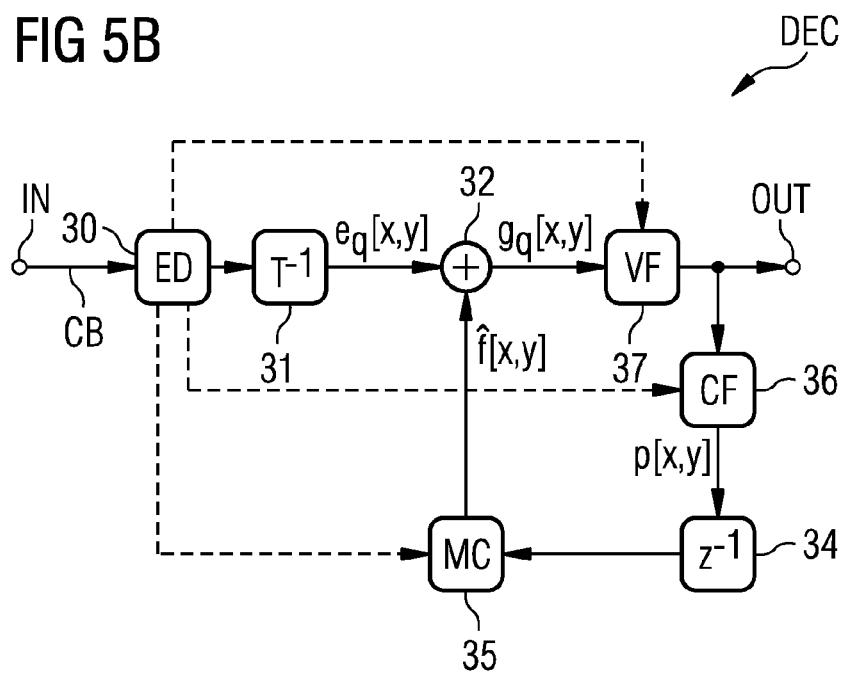

In the third embodiment of FIG. 5A illustrating the encoder and FIG. 5B illustrating the decoder the visual filter also can be part of the prediction loop.

Figure 6A:
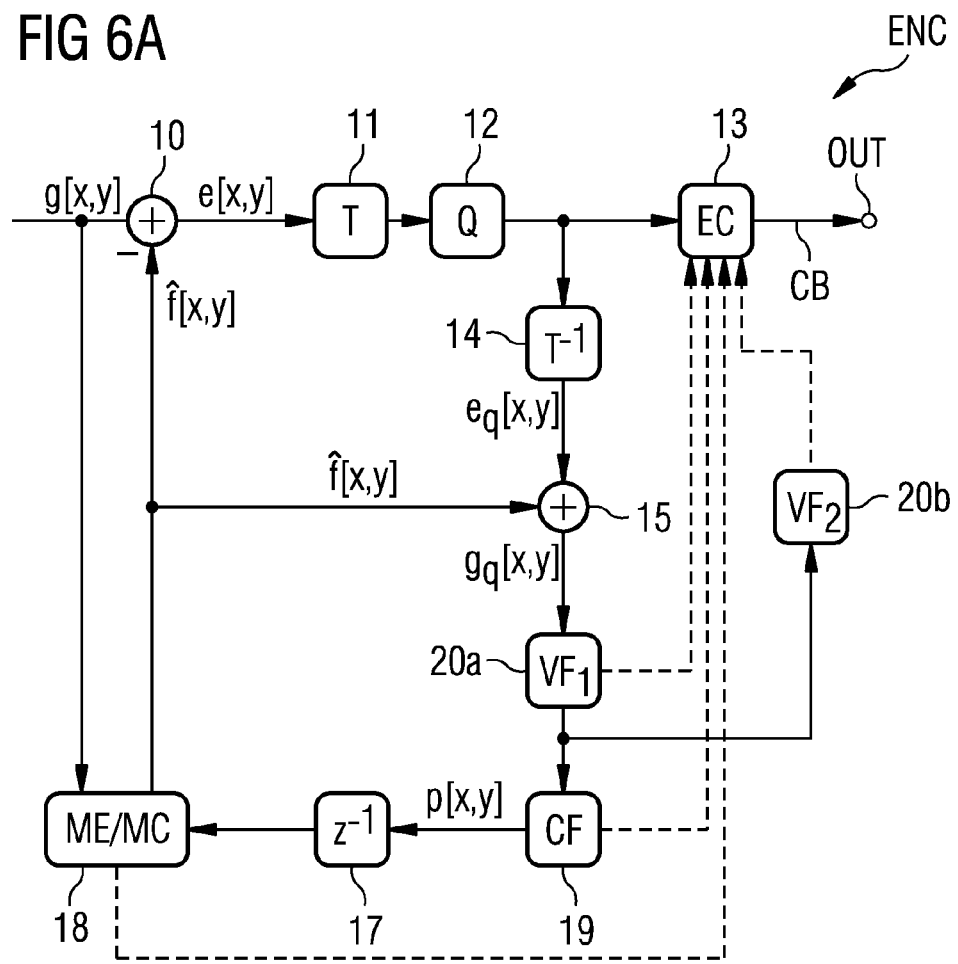
FIGS. 6A and 6B are block diagrams of a fourth embodiment of an encoder and a decoder, respectively.
Figure 6B:
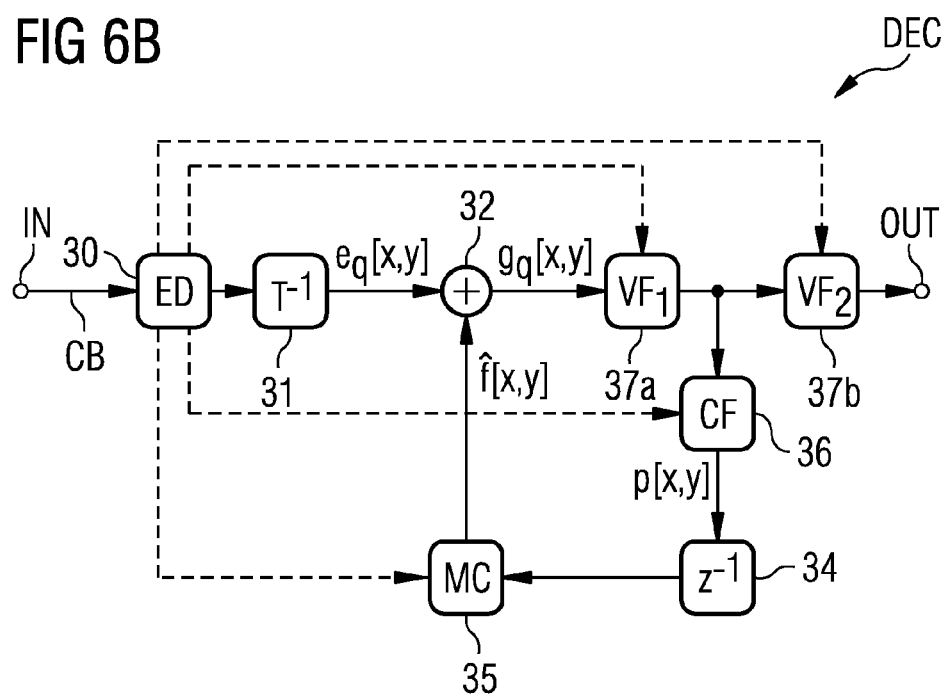

FIG. 6A and FIG. 6B show a combination of the second and third embodiment, where a visual filter 20a and 37a, respectively, is arranged within the prediction loop and a second visual filter 20b and 37b is located outside the prediction loop. As in the second embodiment in FIGS. 4A and 4B the compression filters 19 and 36, respectively, are positioned within the prediction loop of the encoder and decoder, respectively. This embodiment is of advantage in case that visual filtering may improve in-loop filtering for prediction. In this case a double filtering can be avoided. Therefore, complexity of the encoder and decoder can be reduced.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for reducing noise for coding of noisy images or image sequences, comprising:
   adding a prediction error, used by an encoder to produce one of an encoded frame and an encoded block, to one of a reference frame and a reference block that includes a useful signal part and a noise signal part;
   filtering the one of the reference frame and the reference block only with a dedicated noise reducing filter to one of reduce and eliminate the noise signal part of the one of the reference frame and the reference block; and
   generating the prediction error from one of a current frame and a current block, and at least part of a current or previous one of the reference frame and the reference block.

2. The method according to claim 1, further comprising motion compensating the one of the reference frame and the reference block by a motion compensation element.

3. The method according to claim 2, wherein the dedicated noise reducing filter is a noise adaptive filter which is adapted to estimate noise by evaluating the one of the reference frame and the reference block.

4. The method according to claim 2, wherein the dedicated noise reducing filter is a pixel location adaptive filter that takes into account content of the one of the reference frame and the reference block.

5. The method according to claim 4, wherein an amount of said filtering is dependent on local signal properties.

6. The method according to claim 5, wherein said filtering of the one of the reference frame and the reference block is made within a prediction loop without directly affecting the prediction error which is to be encoded by the encoder.

7. The method according to claim 6, wherein said filtering is applied on each color channel of the one of the reference frame and the reference block separately or in combination.

8. The method according to claim 7, wherein the current block and the reference block are both in a single frame.

9. The method according to claim 8, wherein the dedicated noise reducing filter is arranged in the encoder and a decoder to reduce or eliminate noise in the reference frame.

10. The method according to claim 9, wherein filter parameters of the dedicated noise reducing filter of the encoder are included in a coded bitstream.

11. The method according to claim 5, further comprising:
    estimating filter parameters of the dedicated noise reducing filter of the encoder by a decoder; and
    providing the filter parameters from the decoder to the dedicated noise reducing filter.

12. The method according to claim 11, wherein said generating of the prediction error includes comparing the current frame to be coded with only a noise-filtered signal part of the one of the reference frame or the reference block.

13. The method according to claim 12, further comprising bypassing a quantization element located in a path between a comparator performing said comparing and an output outputting a coded bitstream.

14. The method according to claim 13, wherein said filtering is adaptive with respect to a quantization parameter of the quantization element such that said filtering is lower as the quantization parameter increases and said filter is greater as the quantization parameter decreases.

15. An encoder for reducing noise for coding of noisy images or image sequences, comprising:
    first means for adding a prediction error, used by an encoder to produce one of an encoded frame and an encoded block, to one of a reference frame and a reference block that includes a useful signal part and a noise signal part;
    second means for filtering the one of the reference frame and the reference block only with a dedicated noise reducing filter to one of reduce and eliminate the noise signal part of the one of the reference frame and the reference block; and
    third means for generating the prediction error from one of a current frame and a current block, and at least part of a current or previous one of the reference frame and the reference block.

16. A decoder for reducing noise for coding of noisy images or image sequences, comprising:
    first means for adding a prediction error, generated by an encoder from one of an original frame and an original block, to one of a reference frame and a reference block that includes a useful signal part and a noise signal part to generate one of a decoded frame and a decoded block; and
    second means for filtering the one of the decoded frame and the decoded block only with a dedicated noise reducing filter to produce the one of the reference frame and the reference block with the noise signal part thereof reduced.

17. A method for reducing noise for decoding of noisy images or image sequences, comprising:

adding a prediction error, generated by an encoder from one of an original frame and an original block, to one of a reference frame and a reference block that includes a useful signal part and a noise signal part to generate one of a decoded frame and a decoded block; and filtering the one of the decoded frame and the decoded block only with a dedicated noise reducing filter to produce the one of the reference frame and the reference block with the noise signal part thereof reduced.

* * * * *